United States Patent

[11] 3,577,779

| | | | |
|---|---|---|---|
| [72] | Inventor | Eric Laimins |
| | | Belmont, Mass. |
| [21] | Appl. No. | 807,190 |
| [22] | Filed | Mar. 14, 1969 |
| [45] | Patented | May 4, 1971 |
| [73] | Assignee | BLH Electronics Inc. |
| | | Waltham, Mass. |

[54] CONSTANT MOMENT BEAM TRANSDUCERS
5 Claims, 8 Drawing Figs.

[52] U.S. Cl. .................................................. 73/141, 338/5
[51] Int. Cl. ...................................................... G01l 1/22
[50] Field of Search .......................................... 73/141; 177/211; 338/2, 5, 6

[56] References Cited
UNITED STATES PATENTS

| | | | |
|---|---|---|---|
| 2,866,059 | 12/1958 | Laimins ........................ | 73/141X |
| 2,920,487 | 1/1960 | Green ........................... | 73/398X |
| 3,004,231 | 10/1961 | Laimins ........................ | 338/5 |
| 3,161,046 | 12/1964 | Farley .......................... | 73/141 |
| 3,180,139 | 4/1965 | Soderholm .................... | 73/141 |
| 3,269,184 | 8/1966 | O'Connor ..................... | 338/4X |
| 3,272,006 | 9/1966 | Eckard ......................... | 73/141 |
| 3,413,845 | 12/1968 | Pugnaire ....................... | 73/141 |

*Primary Examiner*—Charles A. Ruehl
*Attorney*—Thomson and Mrose

ABSTRACT: A strain-responsive force transducer includes a constant moment parallelogram-type cantilever-beam unit equipped with strain gages wherein the cantilever-beam unit is held fixed at one end to a support and has a movable end rigidly secured to a force-applying member, guided by spaced diaphragms, the cantilever-beam unit being directly connected between the support and force-applying member without auxiliary flexure provisions and accommodating relative movement between the force-applying member and support with minimum attendant nonlinearities in electrical outputs developed by the strain gages.

Patented May 4, 1971

INVENTOR
ERIC LAIMINS by Thomson, Mhose & Ericson
ATTORNEYS

INVENTOR
ERIC LAIMINS

ATTORNEYS

INVENTOR
ERIC LAIMINS by
Thomson, Mrose & Ericson
ATTORNEYS 3,577,779

CONSTANT MOMENT BEAM TRANSDUCERS

BACKGROUND OF THE INVENTION

The present invention relates generally to improvements in electrical strain gauge transducers of the cantilever-beam type, and, in one particular aspect, to novel and improved strain-responsive transducers wherein constant moment parallelogram-type cantilever elements are secured to force-applying members so as to promote accurate responses to forces applied in either of two directions with a high degree of linearity, and wherein such transducers are sealed into compact form without adverse effects upon their electrical outputs.

It has long been well known to measure elastic strains resulting from loading-induced stresses of elements such as beams, columns, diaphragms, and the like, using electrical strain gauges for the accurate translations of the exhibited strains into convenient related variations in electrical impedances. Wire, foil and semiconductor-type gauges find widespread application in such devices and well lend themselves to manufacture in highly miniaturized forms suitable for installation upon small surface areas of such sensing elements. Cantilever beams have proven to be a highly advantageous basis for design of sensing elements. However, the arcuate deflections of the movable end of such a beam results in different effective moment arms, with consequent undesirable varying relationships between the applied forces and the strains measured by gauges affixed to the beam, and with consequent undesirable extraneous loadings of the force-applying member and of the beam, as well as undesirable loadings of associated diaphragms used for sealing and/or guiding. Various forms of linkages between the force-applying member and movable beam end have been suggested in efforts to overcome these problems; however, these have generally been of relatively costly manufacture, have not readily lent themselves to precise control of the beam deflection characteristics, have not been well suited to bidirectional force measurements, have not been suited to low-profile design, and have generally been limited to relatively small loading capacities.

SUMMARY OF THE INVENTION

Accordingly, it is one of the objects of the present invention to provide novel and improved force-responsive structure which is highly precise and exhibits good linearity in a low-profile device.

Another object of the invention is the provision of a new and improved force-responsive structure of the constant movement type wherein certain nonlinearity-inducing effects, such as diaphragm forces are minimized.

It is yet another object of the present invention to provide a novel and improved high-precision low-profile force-responsive structure which exhibits good linearity and in which undesirable nonlinearity-inducing effects such as diaphragm and atmospheric pressure forces are significantly reduced.

Briefly, in accordance with one embodiment of this invention these and other objects are attained by providing a strain-responsive apparatus including a support, a force-applying member mounted through diaphragms for movement along an axis which is fixed in relation to the support, a constant movement parallelogram-type cantilever beam fixed at one end to the support and joined at the other relatively movable end with the force-applying member for linear movements within an enclosure sealed at opposite ends by the diaphragms, and strain gauges responsive to strains exhibited by the beam member and connected to develop electrical outputs characterizing applied forces acting in the direction of the linear movements.

Although the features of this invention which are considered to be novel are set forth in the appended claims, further details as to preferred practices and as to the further objects and advantages thereof may be most readily comprehended through reference to the following description taken in connection with the accompanying drawings.

DESCRIPTION OF THE PREFERRED EMBODIMENTS

Figure 1:
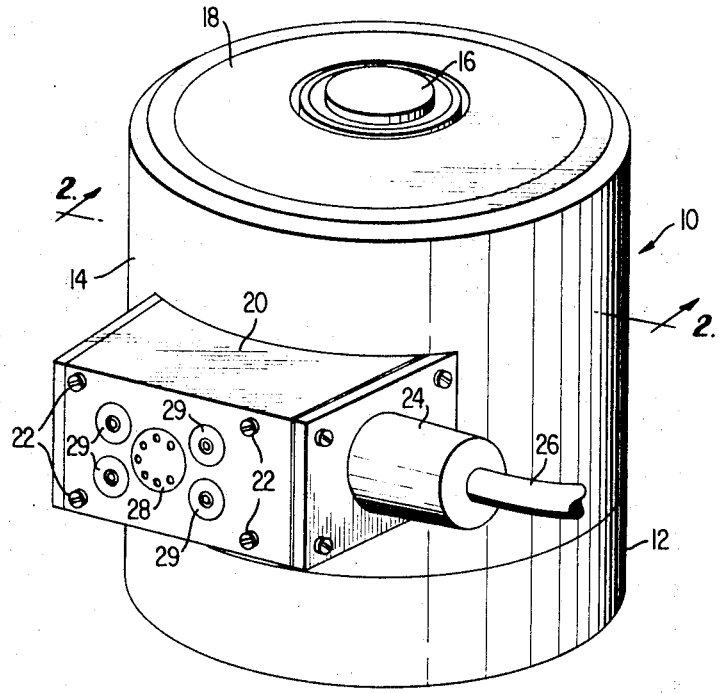
FIG. 1 is a perspective view of an improved strain-responsive force transducer.

The strain-responsive force transducer illustrated in FIG. 1 is of a low-height, or so-called "low-profile" design which lends itself particularly well to those applications and installations wherein space is at a premium, and more particularly, in combination with a weighing platform where it is especially desirable and in some instances mandatory to limit the total height of such devices, such that the weighing platform may be as close to the base as is possible. The outer configuration of the strain-responsive force transducer of the present invention reveals a generally cylindrical housing or support indicated by the reference numeral 10 including a cup-shaped base member 12 and a cylindrical wall member 14 extending upwardly therefrom. A load receiving button 16 is maintained in a centrally disposed position with respect to cylindrical support member 14, in a manner to be more fully described hereinafter, with a shield 18 extending across the top surface of the support member between the cylindrical wall member 14 and the load receiving button 16. A housing 20 of metal or other suitable material is secured to the base section 12 of support 10 by conventional means, such as screws 22 for providing suitable electrical access to the interior of the transducer. Adequate sealing means, such as a gasket (not shown) is provided between housing 20 and base member 12 for preventing undesirable elements, such as dirt and water from entering the interior of the transducer. A conventional plug 24 and associated cable 26 are provided in either a permanent or removable manner for including the electrically responsive strain elements within the transducer into a suitable circuit, such as a Wheatstone bridge, such that the load applied to button 16, either in tension or compression, may be monitored or recorded by suitable conventional apparatus externally from the transducer. A second plug 28 and associated resistors 29 are provided by housing 20 such that the transducer may be calibrated and adjusted to give a substantially true output. The particular calibration technique and apparatus used therefor do not play any part in the present invention and are therefore not further described within the body of the present application.

Figure 2:
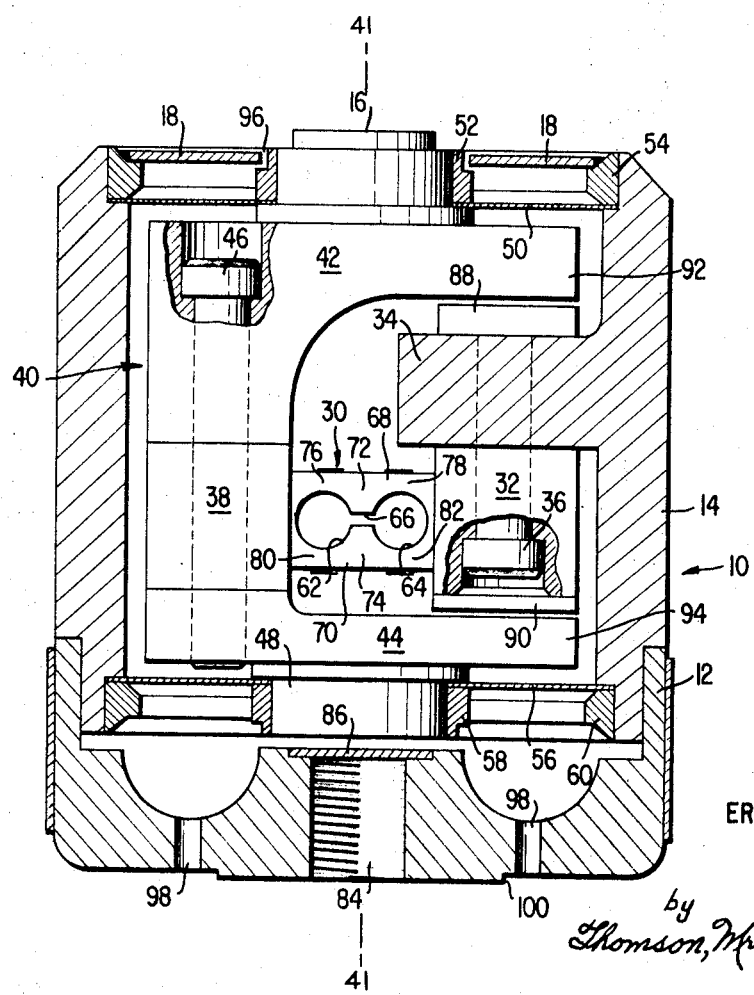
FIG. 2 is a cross-sectional view of the transducer of FIG. 1 taken along the line 2—2 of FIG. 1.

Referring now to FIG. 2, a flexible cantilever beam, indicated generally by the reference numeral 30, is rigidly supported at one end 32 thereof by being affixed to an internally projecting shelf portion 34 of support 10 by conventional means, such as screw 36 with the other relatively movable end 38 joined with the force-applying member indicated generally by the reference numeral 40. Force-applying member 40 includes a pair of generally inflexible members 42 and 44 secured to opposed surfaces of the relatively movable end 38 of the flexible cantilever beam 30 by conventional means, such as screw 46 projecting through members 42 and 38 and being threadedly received within member 44. Load receiving button 16 is integrally formed with member 42, and a corresponding button member 48 is likewise integrally formed on member 44 with both members 16 and 48 lying along the central axis of the transducer for defining the axis of movement of the force-applying member in a manner to be more fully explained hereinafter. A ring-shaped metal diaphragm 50 is securely attached to member 16 by an inner ring member 52 which is in turn secured to member 16 by conventional means, such as welding. The outer peripheral portion of diaphragm 50 is securely attached to support member 14 by an outer circumferential ring member 54 which is in turn secured to member 14 by conventional means, such as welding. A second diaphragm 56 supports the force-applying member at its lower portion in a similar manner by being secured at the inner peripheral portion to member 48 by an inner ring member 58 and at the outer peripheral portion to the support member 14 by an outer ring 60. Diaphragms 50 and 56 exhibit sufficient structural characteristics so as to be able to retain members 16 and 48 in the centrally disposed position shown in the drawing while permitting the force-applying member 40 to move axially along the axis of motion thereof as defined by the central axis of the transducer, 41-41. It can be seen therefore that the force-applying member 40 has the capability of linear motion along the axis of movement 41-41, while being restrained from movement radially of the axis by the diaphragm members 50 and 56. Since the force-applying member 40 is substantially limited to linear motion resulting from a tensile or compressive force being applied at member 16, beam end 38 is likewise substantially limited to linear movement parallel to the axis of movement of the force-applying member. An elastically-deformable beam arrangement interconnects, and is generally formed integral with, beam ends 32 and 38. That arrangement is conveniently formed by two, preferably equal-diameter, holes 62 and 64 crosswise of the bar, with a straight slot 66, suitably machined as by milling, connecting the two holes and thereby providing an upper beam 68 and a lower beam 70. The slot 66 is preferably but not necessarily, formed along a plane containing the axes of the holes 62 and 64, but in any event, the position of the slot is such as to provide horizontally extending rigid portions 72 and 74 between the upper and lower halves of the two holes. The holes are drilled with their axes lying in a common plane which is substantially parallel to the top and bottom surfaces of the beam and are sufficiently close to the top and bottom surfaces of the beam so that relatively thin sections 76 and 78 are provided for the upper beam 68 and relatively thin sections 80 and 82 are provided for the lower beam 70. The holes are also disposed inwardly from the ends of the beam so that relatively heavy ends may be suitably provided, whereby the two beams 68 and 70 are held in parallelism at all times during deflection thereof upon application of a load to the relatively movable end 38 of the beam. It is to be understood that other parallelogram-type constant moment beam arrangements may be utilized with the transducer illustrated in FIG. 2, such as those described hereinafter with reference to FIGS. 4, 5 and 6.

A threaded aperture 84 having a suitable protective shield 86 secured across the inner open end thereof by suitable means, such as welding, provides a convenient means for securing the transducer to a bass structure. To prevent overloading of the transducer in both tension and compression, suitable spacers of shims 88 and 90 are provided with spacer 88 being secured to or formed integrally with shelf 34 and spacer 90 being secured to or formed integrally with fixed end 32 of the cantilever beam. Leg section 92 of member 42 will come into abutment with spacer 88 when the force-applying member is placed under compressive forces and leg portion 94 of member 44 will come into contact with spacer member 90 when the force-applying member experiences a tensile force.

To avoid possible adverse effects of barometric pressure being exerted against member 16 which would consequently result in a change in the measured force experienced by the force-applying member the transducer is so constructed that the effects of barometric pressure are eliminated. Clearance is provided about the inner peripheral portion of protective cover 18 as shown at 96, such that barometric pressure may be exerted freely upon the entire surface of member 16, as well as the exposed surface of diaphragm 50. In the base section 12 of support member 10 are formed apertures 98 with that section of the base portion slightly elevated above the base resting portion as shown at 100, such that atmospheric pressure may freely enter from the underside of the base member to the interior thereof for exerting a force across member 48 and the exposed surface portion of diaphragm 56. Since the total effective area of member 16 and diaphragm 50 is equal to the total effective area of member 48 and diaphragm 56, an equal force will be experienced by the upper and lower portions of force-applying member 40 due to atmospheric pressure, and it will not tend to deflect erroneously.

To convert into electrical signals the strain experienced at sections 76, 78, 80 and 82, due to a force being applied to beam end member 48 by the force-applying member, a strain gauge of the wire, foil or semiconductor type is bonded to the flat outer surface adjacent each of the thin sections. Due to the small cross section of these sections relative to the cross section of beams 68 and 70 at all other locations, the areas of highest strain will be concentrated there, such that the strain gauges associated therewith will reflect the high strains experienced. Furthermore, since the strain gauges may always be applied to a flat surface, this particular transducer is especially well suited for the use of semiconductor-type strain gauges.

Figure 3:
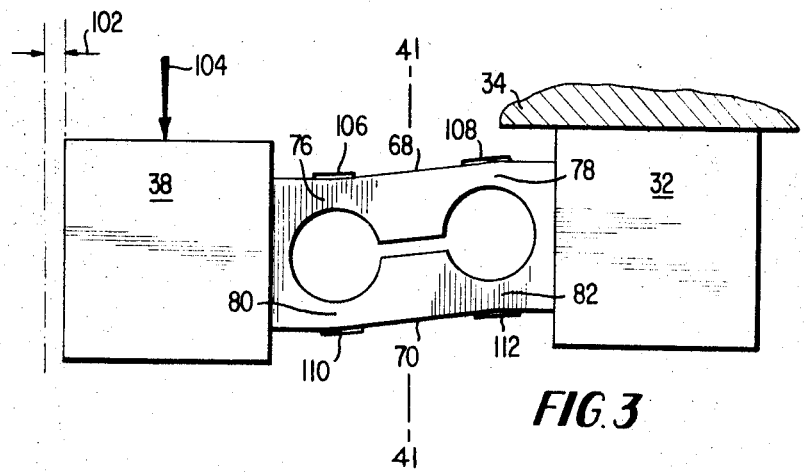
FIG. 3 illustrates a parallelogram-type constant moment cantilever transducer beam under a loaded condition.

To more fully understand the advantageous parallelogram-type motion which is experienced by the constant moment beam and which promotes linearity in the weight versus output characteristics of the transducer, reference is made to FIG. 3 wherein such motion is characterized in an exaggerated manner. There, the parallelogram-type cantilever-beam element, firmly connected between the support shelf 34 and the force-applying member, is shown to have its deflected end 38 effectively drawn inwardly by an amount 102 when the beam is heavily loaded by forces designated by arrow 104. The rigid ends 32 and 38 hold the two beams 68 and 70 in parallelism at all times during deflection thereof upon application of the 104 to the free end 38 of the beam. Elastic deformations occur at the sections 76, 78, 80 and 82, thus creating optimum surfaced deformations at positions where the strain gauges 106, 108, 110 and 112 are bonded. The two sections 76 and 80 and the two sections 78 and 82 are about equally offset laterally from the central force axis 41-41, on opposite sides thereof, which results first in a desirable symmetry tending to promote transducer linearity and, second, in a desirably greater length for the beam unit than would be readily obtainable otherwise, and, third, in a desirably small transducer diameter.

Figure 4:
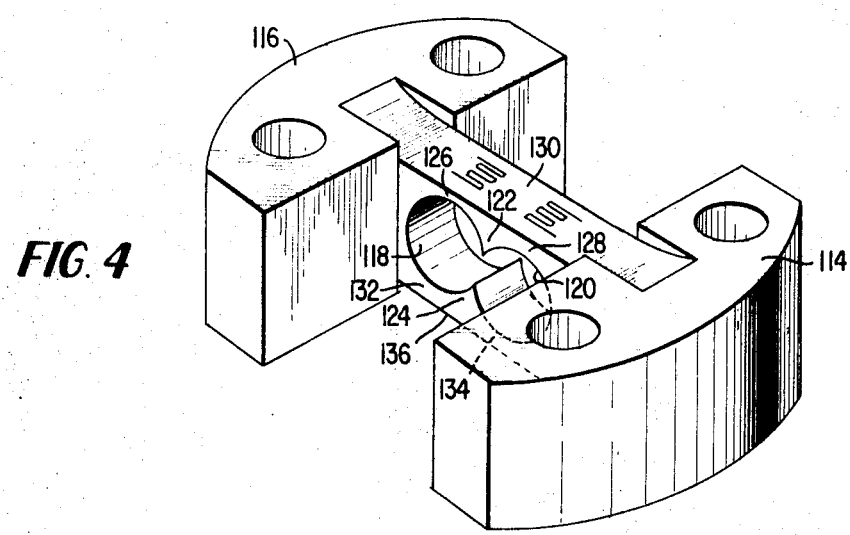
FIG. 4 is a perspective view of a second embodiment of a parallelogram-type beam which may be utilized with the device of FIG. 2.

Referring now to FIG. 4, there is illustrated a second embodiment of a parallelogram-type constant moment cantilever beam which may be utilized in place of the cantilever beam illustrated in FIG. 2. The cantilever beam illustrated in FIG. 4 is somewhat more sensitive and capable of deflection as a result of lighter loads, for example 10 through 100 pounds, than the beam member illustrated in FIG. 2, which is designed for heavier loads, for example 25 through 300 pounds. The more sensitive beam, as shown in FIG. 4, includes a fixed end 114 and a relatively movable end 116 of the same size, shape and general configuration as the end members 32 and 38 respectively of the beam member illustrated in FIGS. 2 and 3. To promote greater elastic deformation in the second embodiment of the cantilever beam, two holes 118 and 120 are drilled crosswise of the connecting bar such that the holes intersect substantially along a common tangent thereof. In this manner, the elongated slot 66 and heavy sections 72 and 74 of the beam illustrated in FIG. 2 are eliminated, and are replaced by rigid portions 122 and 124 which are obviously of lesser linear extent than sections 72 and 74. The holes are drilled with their axes lying in a common plane which is substantially parallel to the top and bottom surfaces of the beam and are sufficiently close to the top and bottom surfaces of the beam so that relatively thin sections 126 and 128 are provided for the upper beam 130 and relatively thin sections 132 and 134 are provided for the lower beam 136. Electrical impedance strain gauge means are bonded to the thin sections 126, 128, 132 and 134 on the outer flat surfaces of the upper beam 130 and the lower beam 136.

Figure 5:
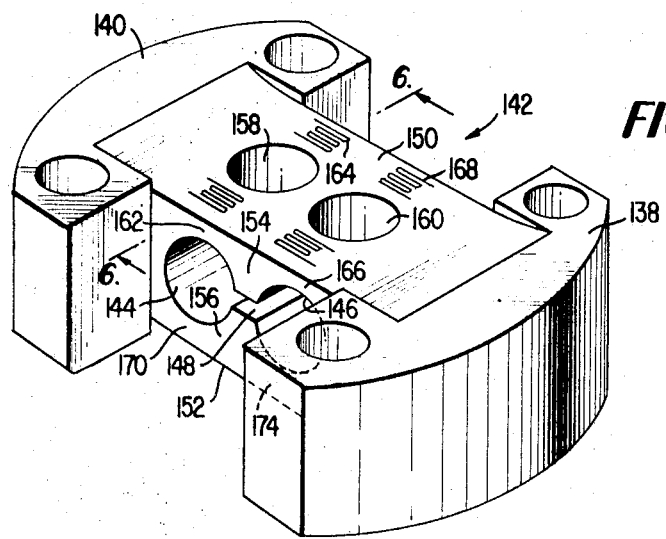
FIG. 5 is a perspective view of a third embodiment of a parallelogram-type beam which may be utilized with the device of FIG. 2.
Figure 6:
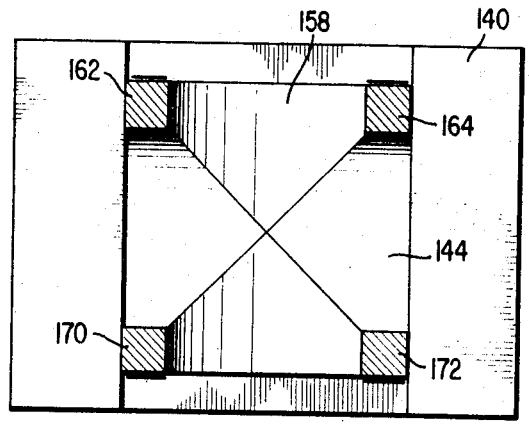
FIG. 6 is a cross-sectional view taken along the line 6—6 of FIG. 5.

As shown in FIGS. 5 and 6, a third embodiment of a parallelogram-type constant movement cantilever beam is provided for accommodating heavier loads, for example 100 through 300 pounds, than the first and second embodiments of the beams. The third embodiment of the cantilever beam includes a fixed end 138 and a relatively movable end 140 with an elastically deformable portion 142 interconnecting the ends. Portion 142 is formed of a solid elongated bar of material having a high modulus of elasticity, with two, preferably equal-diameter holes, 144 and 146, crosswise of the bar and with a straight slot 148, suitably machined as by milling, to connect the two holes thereby providing an upper beam 150 and a lower beam 152. The slot 148 is preferably, but not necessarily, formed along a plane containing the axes of the holes 144 and 146 but, in any event, the position of the slot is such as to provide horizontally extending rigid portions 154 and 156 between the upper and lower halves of the two holes. The holes are drilled with their axes lying in a common plane which is substantially parallel to the top and bottom surfaces of the beam. Two further holes, 158 and 160, are drilled through the top and bottom surfaces of the beam so as to intersect holes 144 and 146, thus providing four relatively thin sections 162, 164, 166 and 168 for the upper beam, and four corresponding relatively thin sections, three of which 170, 172 and 174 are shown on the drawing, are provided for the lower beam.

Figure 7:
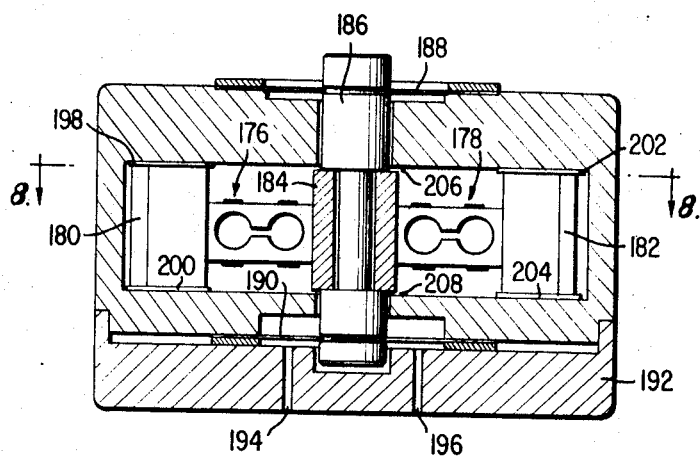
FIG. 7 is a cross-sectional view of a transducer including a pair of parallelogram-type cantilever beams.
Figure 8:
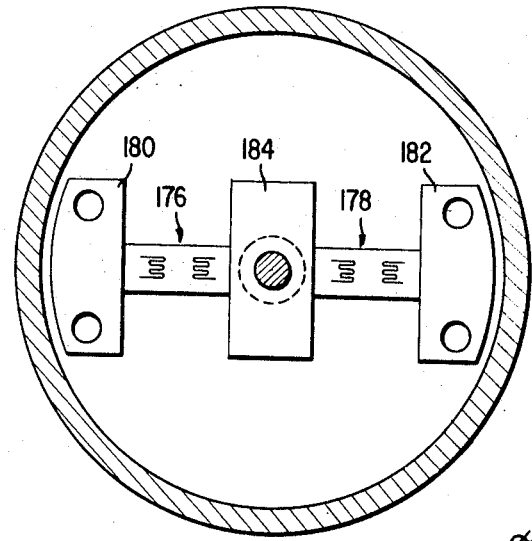
FIG. 8 is a cross-sectional view taken along the line 8—8 of FIG. 7.

Although the invention has been so far described as including a single parallelogram-type constant movement beam, it is within the scope of the present invention to include two or more such beams, as illustrated in FIGS. 7 and 8 wherein a pair of linearly-deflecting beam units 176 and 178 are illustrated as interconnecting a pair of fixed end members 180 and 182 respectively, to a common relatively movable end 184. Relatively movable end 184 is mounted on a force-applying member 186 which is in turn mounted for linear movement by an upper diaphragm 188 and a lower diaphragm 190. Within the base of the support 192 are formed a pair of apertures 194 and 196 to allow atmospheric pressure to act across the bottom surface of diaphragm 190 and the associated portion of the force-applying member 186 to compensate for the effect of atmospheric pressure being applied across the top surface of diaphragm 188 and the associated portion of force-applying member 186. Spacing elements or shims 198, 200, 202 and 204 are secured between the support 192 and the associated portions of fixed end members 180 and 182 so as to provide clearance spaces 206 and 208 between the support member 192 and the end portions of relatively movable beam ends 184 such that overload protection is provided for the transducer by limiting the axial movement of force-applying member 186 and relatively movable beam end 184 when subjected to both tensile and compressive forces. It is to be understood that any of the linearly-deflecting beam units disclosed within the present application, as well as other parallelogram-type constant movement cantilever beam units, may be utilized in a plural multiple-beam transducer, including dual-unit arrangements such as that in FIGS. 7 and 8, and that electrical strain gauge elements and associated circuitry is utilized therewith in substantially the same manner as in the embodiments previously described. Not only do the beam units themselves tend to develop strain-gauges outputs linearly related to the forces which deflect them, when the gauges are interconnected in a bridge-circuit configuration already well known in the art, but, in addition, the ends of the beam units tend to move linearly rather than arcuately, such that the associated diaphragms are not twisted in a manner which would otherwise tend to introduce unwanted errors due to nonlinear characteristics of these diaphragms.

Accordingly, it should be understood that the embodiments and practices herein described have been presented by way of disclosure rather than limitation, and that various modifications, combinations and substitutions may be effected by those skilled in the art without departure in spirit or scope from this invention in its broader aspects and as set forth in the appended claims.

I claim:

1. Strain-responsive apparatus comprising a rigid support, a rigid force-applying member, a pair of spaced diaphragms each independently interconnecting a different end of said force-applying member with said support and restraining said force-applying member from radial movement with respect to an axis which is fixed in relation to said support while allowing movement thereof along said axis, a constant moment parallelogram-type cantilever beam unit including substantially parallel spaced elongated upper and lower beam elements the ends of which have rigid interconnections and each of which has elastically deformable portions near the ends thereof, means rigidly connecting the rigid interconnection of one of the ends of said beam unit to said support, means rigidly connecting the opposite rigid interconnection of the other of the ends of said beam unit to said rigid force-applying member between said diaphragms with said upper and lower beam elements substantially perpendicular to said axis and spaced apart in directions of said axis, and strain gauge means responsive to strains exhibited by said beam unit and characterizing forces applied to said other of said ends thereof by said force-applying member in directions of said axis.

2. Strain-responsive apparatus as set forth in claim 1 wherein said force-applying member includes a pair of rigid members secured to opposed surfaces of said opposite interconnection of said other of the ends of said beam unit at a position laterally displaced in relation to said axis for movement in directions parallel with and displaced from said axis, each of said rigid members extending laterally parallel with said beam elements in spaced relation thereto and having at least a portion thereof longitudinally aligned with said axis of movement, and wherein said diaphragms interconnect said longitudinally aligned portions with said support and restrain said longitudinally aligned portions from radial movement with respect to said axis while allowing movement thereof along said axis.

3. Strain-responsive apparatus as set forth in claim 2 wherein said diaphragms are in sealing relationship with said longitudinally aligned portions and with said support and, together with said support, enclose and seal said beam unit and strain gauge means therebetween, each of said diaphragms having the outer surface thereof exposed to atmospheric pressure, the total effective areas of outer surfaces exposed to atmospheric pressure within the expanses of the two diaphragms being substantially equal.

4. Strain-responsive apparatus comprising a support, a force-applying member, means mounting said force-applying member for movement along an axis which is fixed in relation to said support, said means for mounting including a pair of diaphragm members each of which interconnects one end of said force-applying member with said support and restrains said force-applying member from radial movement along said axis, a constant moment parallelogram-type cantilever-beam unit, means rigidly connecting said unit at one end to said support, means rigidly connecting an opposite relatively movable end of said unit with said force-applying member between said diaphragms, strain gauge means responsive to strains exhibited by said beam unit and characterizing forces applied to said opposite end thereof in directions of said axis, a second constant moment parallelogram-type cantilever-beam unit rigidly fixed at one end to said support and rigidly fixed at the other relatively movable end with said force-applying member, and strain gauge means responsive to strains exhibited by said second beam unit and characterizing forces applied to said opposite end thereof in directions of said axis, said cantilever beam units being integrally formed from the same stock and being disposed on opposite sides of said axis along the same diameter, each of said beam units including an elongated member having two interconnected transverse holes dividing it into substantially parallel upper and lower beams having elastically deformable portions adjacent the top and bottom of the holes and relatively rigid sections between the upper halves of each hole and between the lower halves of each hole, said holes being disposed inwardly of the ends of the member so as to leave end portions rigidly connecting the corresponding ends of the beams together.

5. Strain-responsive apparatus comprising a support, a force-applying member, means mounting said force-applying member for movement along an axis which is fixed in relation to said support, said mounting means including a pair of diaphragm members each of which interconnects one end of said force-applying member with said support and restrains movement with respect to said axis while allowing movement along said axis, a constant moment parallelogram-type cantilever-beam unit, means rigidly connecting said unit at one end to said support, means rigidly connecting an opposite relatively movable end of said unit with said force-applying member, and strain gauge means responsive to strains exhibited by said beam unit and characterizing forces applied to said opposite end thereof in directions of said axis, said beam unit including an elongated member having two interconnected transverse holes dividing it into substantially parallel upper and lower beams having an elastically deformable portions adjacent the top and bottom of the holes and relatively rigid sections between the upper halves of each hole and between the lower halves of each hole, said holes being disposed inwardly of the ends of the member so as to leave end portions rigidly connecting the corresponding ends of the beams together, said beam unit further including a second pair of holes defined in said elongated member and of substantially the same diameter as said first-mentioned holes, each of said second holes respectively intersecting one of said first-mentioned holes and being perpendicular thereto.